US010135044B2

(12) United States Patent
Qin (10) Patent No.: US 10,135,044 B2
(45) Date of Patent: Nov. 20, 2018

(54) MULTI-FUNCTIONAL BATTERY BOX (71) Applicant: ACE GIFT & CRAFT (NINGBO) CO., LTD., Ningbo, Zhejiang Province (CN)

(72) Inventor: Yanbei Qin, Ningbo (CN)

(73) Assignee: ACE GIFT & CRAFT (NINGBO) CO., LTD., Ningbo, Zhejiang Province (CN)

( * ) Notice: Subject to any disclaimer, the term of this patent is extended or adjusted under 35 U.S.C. 154(b) by 212 days.

(21) Appl. No.: 15/361,963

(22) Filed: Nov. 28, 2016

(65) Prior Publication Data
US 2018/0062126 A1    Mar. 1, 2018

(30) Foreign Application Priority Data

Aug. 31, 2016  (CN) .......................... 2016 1 0793042

(51) Int. Cl.
*H01M 2/10* (2006.01)
*A44C 15/00* (2006.01)
*H01M 6/50* (2006.01)

(52) U.S. Cl.
CPC ......... *H01M 2/1022* (2013.01); *A44C 15/005* (2013.01); *A44C 15/0015* (2013.01); *H01M 2/1016* (2013.01); *H01M 2/1044* (2013.01); *H01M 2/1055* (2013.01); *H01M 2/1066* (2013.01); *H01M 6/50* (2013.01); *H01M 6/5005* (2013.01); *H01M 2220/30* (2013.01)

(58) Field of Classification Search
CPC ............. H01M 2/1022; H01M 2/1044; H01M 2/1055; H01M 2/1066; A44C 15/0015

USPC ............................................................ 429/7
See application file for complete search history.

(56) References Cited

U.S. PATENT DOCUMENTS 4,791,536 A * 12/1988 James ................ A44C 15/0015
                                                    362/104
5,367,575 A * 11/1994 Dieken .................. A61B 7/045
                                                    381/67

FOREIGN PATENT DOCUMENTS

| CN | 201267240 Y | 7/2009 |
| CN | 202076349 U | 12/2011 |
| CN | 204792984 U | 11/2015 |
| JP | 2008071592 A | 3/2008 |

* cited by examiner

Primary Examiner — Kenneth J Douyette
Assistant Examiner — James M Erwin
(74) Attorney, Agent, or Firm — NK Patent Law (57) ABSTRACT The present invention discloses a multi-functional battery box, belonging to the field of power supply devices; a multi-functional battery box, comprising: a case, having an accommodating cavity; a printed circuit board, located in the accommodating cavity and permanently connected with the case; a power source, located in the accommodating cavity and in contact with the printed circuit board; an electro-acoustic transducer, permanently arranged on the printed circuit board and electrically connected with the printed circuit board; a spring piece, arranged on the case and in contact with the printed circuit board; a change-over switch, flexibly connected with the printed circuit board; the present invention has two switching modes that can be flexibly switched, making the battery box easier and more flexible to use, reducing the loss to the switch and prolonging the life of the battery box.

17 Claims, 9 Drawing Sheets

MULTI-FUNCTIONAL BATTERY BOX

CROSS-REFERENCE TO RELATED APPLICATIONS

This application claims priority to Chinese Patent Application No. 201610793042.4 filed on Aug. 31, 2016, the entire contents of which are incorporated by reference herein.

BACKGROUND OF THE INVENTION

1. Technical Field

The present invention relates to the field of power supply devices, and more particularly, to a multi-functional battery box.

2. Description of Related Art

The battery box is a common structure for supplying power. It is most often found that a connecting latch is connected to the ends of accessories. As the life improves, a battery box can be used as a connecting latch to supply power for the illuminating accessories in the prior art.

For instance, the authorized publication No. CN 204792984 U utility model discloses a battery box and the necklace with thereof. The battery box comprises a case and a printed circuit board accommodated in the case, wherein the printed circuit board is provided with a contact, a battery is mounted in the case and connected with the printed circuit board, and a spring piece is arranged on the case so that the contact will be made to contact the battery and connect the battery and the printed circuit board, thus the battery supplying power to the printed circuit board; in addition, repetition of pressing the spring piece can light the necklace pendant in three different modes. The battery box is of a simple structure, easy to use and assemble, but it has the following technical disadvantages: 1. the printed circuit board of the battery box can be energized by pressing the spring piece only and it is not easy to turn on and off the battery box, causing great inconvenience to users; 2. such mechanical switching method can cause damage to the spring piece, poor contact between the contact and the battery and other problems, resulting in that the printed circuit board cannot supply power as expected and the battery box cannot function, shortening the entire battery box's life.

In summary, a multi-functional battery box easy to use and having a longer life is designed to solve the technical problems of the battery box above.

BRIEF SUMMARY OF THE INVENTION

The aim of the present invention is to provide a multi-functional battery box easy to use and having a longer life for the technical problems in the prior art.

The aim of the present invention can be realized by the following technical solution: a multi-functional battery box, comprising:

a case, having an accommodating cavity, and a printed circuit board, located in the accommodating cavity and permanently connected with the case;

a power source, located in the accommodating cavity and in contact with the printed circuit board;

an electro-acoustic transducer, permanently arranged on the printed circuit board and electrically connected with the printed circuit board;

a spring piece, arranged on the case and in contact with the printed circuit board;

a change-over switch, flexibly connected with the printed circuit board;

when the change-over switch electrically connects the electro-acoustic transducer, the power source and the printed circuit board, the electro-acoustic transducer can transduce sound signals into electrical signals and powers the printed circuit board; when the change-over switch electrically connects the power source and the printed circuit board, power can be supplied to the printed circuit board by pressing the spring piece.

In the multi-functional battery box described above, the case comprises an upper case body and a lower case body, wherein a strip-shaped slot is made through the outer surface of the upper case body, spaced apart at its ends and enclosing the spring piece.

In the multi-functional battery box described above, a recess is formed into the outer surface of the upper case body, and the spring piece is arranged within the recess.

In the multi-functional battery box described above, at least one connecting post is provided on and protruding from the inner surface of the upper case body and the printed circuit board is provided with at least one connecting hole, the connecting post passes through the connecting hole and is detachably connected with the lower case body.

In the multi-functional battery box described above, cushion blocks are arranged at two sides of the inner surface of the upper case body, permanently connected with the inner surface of the upper case body and the side walls of the upper case body, and the two sides of the printed circuit board rest on the corresponding cushion blocks.

In the multi-functional battery box described above, curved retaining blocks are arranged on and protruding from the inner surface of the lower case body, enclosing a mounting trough for mounting a battery, and the printed circuit board lies on the mounting trough and contacts the battery.

In the multi-functional battery box described above, an accommodating groove is formed into the outer surface of the lower case body, a mounting opening communicating with the mounting trough and intended for mounting battery is made in the bottom of the accommodating groove, and a cover plate, provided in the accommodating groove, flexibly connected with the lower case body and with its outer surface flushing with that of the lower case body, is designed for closing the mounting opening.

In the multi-functional battery box described above, an conductive wiring is provided in the accommodating cavity, one spiral end of the conductive wiring is placed between the battery cathode and the cover plate and the other end contacts the printed circuit board so that when the spring piece is pressed, the battery is connected with the printed circuit board and supplies power to the same.

In the multi-functional battery box described above, pins are provided at and extend outward from one end of the cover plate, and slots for inserting and fastening the pins are made in the lower case body along the edge of the accommodating groove.

In the multi-functional battery box described above, a protruding block is provided at one end of the lower surface of the cover plate and made with a wire accommodating groove, and a mounting notch is made in the bottom of the accommodating groove and communicating with the mounting trough, so that when the cover plate is placed in the accommodating groove, the protruding block goes into the mounting notch and the conductive wiring is placed in the wire accommodating groove.

In the multi-functional battery box described above, a left end cap is provided for and flexibly connected with the one end of the case and a right end cap is provided for and flexibly connected with the other end of the case, wherein a wire hole for fixing the light wire is made through the left end cap, accommodating holes for plug-in connectors used for electrical connection with the light wire and the printed circuit board respectively to pass through are made through the right end cap.

In the multi-functional battery box described above, a first clamping part protrudes from one end of the case, a first clamping groove is made at each side of the first clamping part, a first clamping block is made on and protruding from the inner wall of each side of the left end cap, and the first clamping blocks are clamped into the first clamping grooves; a second clamping part protrudes from the other end of the case, a second clamping groove is made at each side of the second clamping part, a second clamping block is made on and protruding from the inner wall of each side of the right end cap, and the second clamping blocks are clamped into the second clamping grooves.

In the multi-functional battery box described above, a mounting part extends outward from the second clamping part, a mounting hole is made through the mounting part and communicates with the accommodating cavity, and a connecting base is located in the mounting hole and clings to the inner walls of the same.

In the multi-functional battery box described above, the plug-in connectors include:

the connecting base, located in the second clamping part and electrically connected with the printed circuit board;

a plug-in block, permanently connected with the light wire, removably connected with the connecting base and allowing electrical connection between the light wire and the printed circuit board.

In the multi-functional battery box described above, the end of the connecting base permanently connected with the printed circuit board is arranged with conductive rods electrically connected with the printed circuit board, the other end of the connecting base is made with a plug-in connecting hole, one end of the conductive rods protrudes through the connecting base into the plug-in connecting hole, the plug-in block is made with jacks into which the light wire protrudes, the plug-in block can be inserted into the plug-in connecting hole and the conductive rods can be inserted into the jacks and electrically connected with the light wire.

In the multi-functional battery box described above, limiting holes are made through the top of the connecting base and communicate with the plug-in connecting hole, and limiting blocks which can move vertically relative to the outer surface of the plug-in block are made on and protruding from the outer surface of the plug-in block. When the plug-in block is inserted into the plug-in connecting hole, the limiting blocks are located in the limiting holes.

In the multi-functional battery box described above, guide notches are made in the side walls of the connecting base and guide blocks are projected on the outer surface of the plug-in block so that when the plug-in block moves into or out of the plug-in connecting hole, the guide blocks moves in the guide notches.

The present invention has the following beneficial effects compared with the prior art:

1. The power supply of the printed circuit board is realized by two different control ways, i.e. the spring piece and the electro-acoustic transducer, in the present invention, so the battery box has two different switching modes. Provision of the change-over switch allows switching between the two switching modes, making the battery box easier and more flexible to use.

2. Two switching modes can be readily switched, reducing the loss to the switch in any mode, protecting the battery box against damages due to continuous use of one switching mode, and effectively prolonging the life of the battery box.

3. The consumption of the electricity of the power source is effectively reduced by control of the power supply of the printed circuit board through the electro-acoustic transducer, prolonging the service hours of the power source.

In the figures, 100, case; 110, upper case body; 111, spring piece; 111a, connecting part; 112, protruding post; 113, recess; 114, strip-shaped slot; 115, connecting post; 116, cushion block; 120, lower case body; 121, curved retaining block; 122, mounting trough; 123, accommodating groove; 124, mounting opening; 125, mounting notch; 130, accommodating notch; 140, cover plate; 141, pin; 142, protruding block; 142a, wire accommodating groove; 150, first clamping part; 151, first clamping groove; 160, second clamping part; 161, second clamping groove; 162, mounting part; 163, mounting hole;

200, printed circuit board; 210, contact; 220, battery; 230, electro-acoustic transducer; 240, changer-over switch; 241, knob; 242, shifting block; 250, connecting hole; 260, conductive wiring; 270, conductive part; 280, connecting base; 281, conductive rod; 282, plug-in connecting hole; 283, limiting hole; 284, guide notch; 290, plug-in block; 291, concave groove; 292, limiting block; 293, guide block;

300, left end cap; 310, first clamping block; 320, wire hole.

400, right end cap; 410, second clamping block; 420, accommodating hole.

DETAILED DESCRIPTION OF THE INVENTION

The technical solution of the present invention will be further described hereinafter with the accompanying figures and embodiments, but the present invention is not limited to these embodiments.

As shown in FIG. 1-4, the multi-functional battery box of the present invention comprises a case 100 and a printed circuit board 200 accommodated in the case 100.

Figure 1:
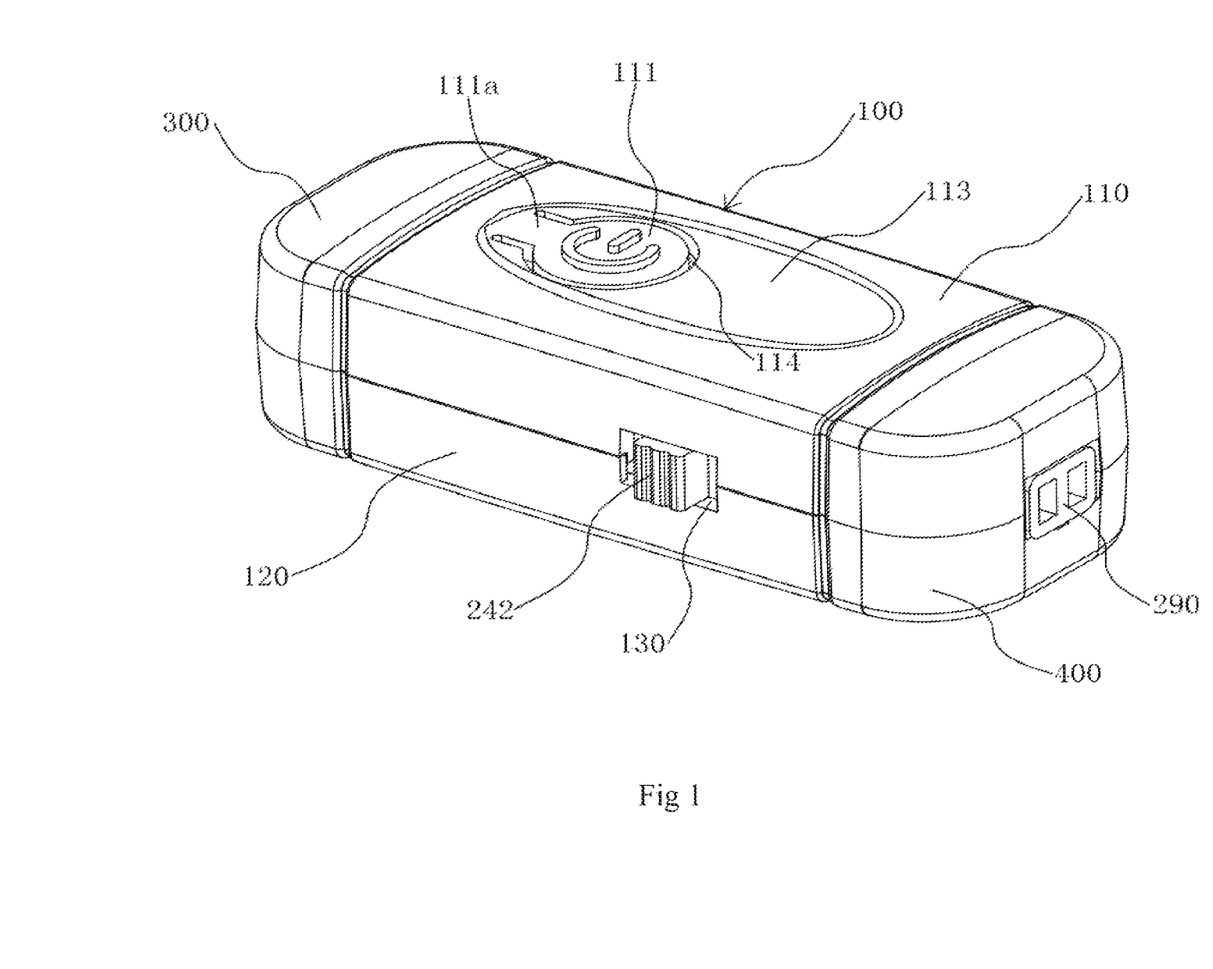
FIG. 1 is a perspective front view of the present invention.
Figure 3:
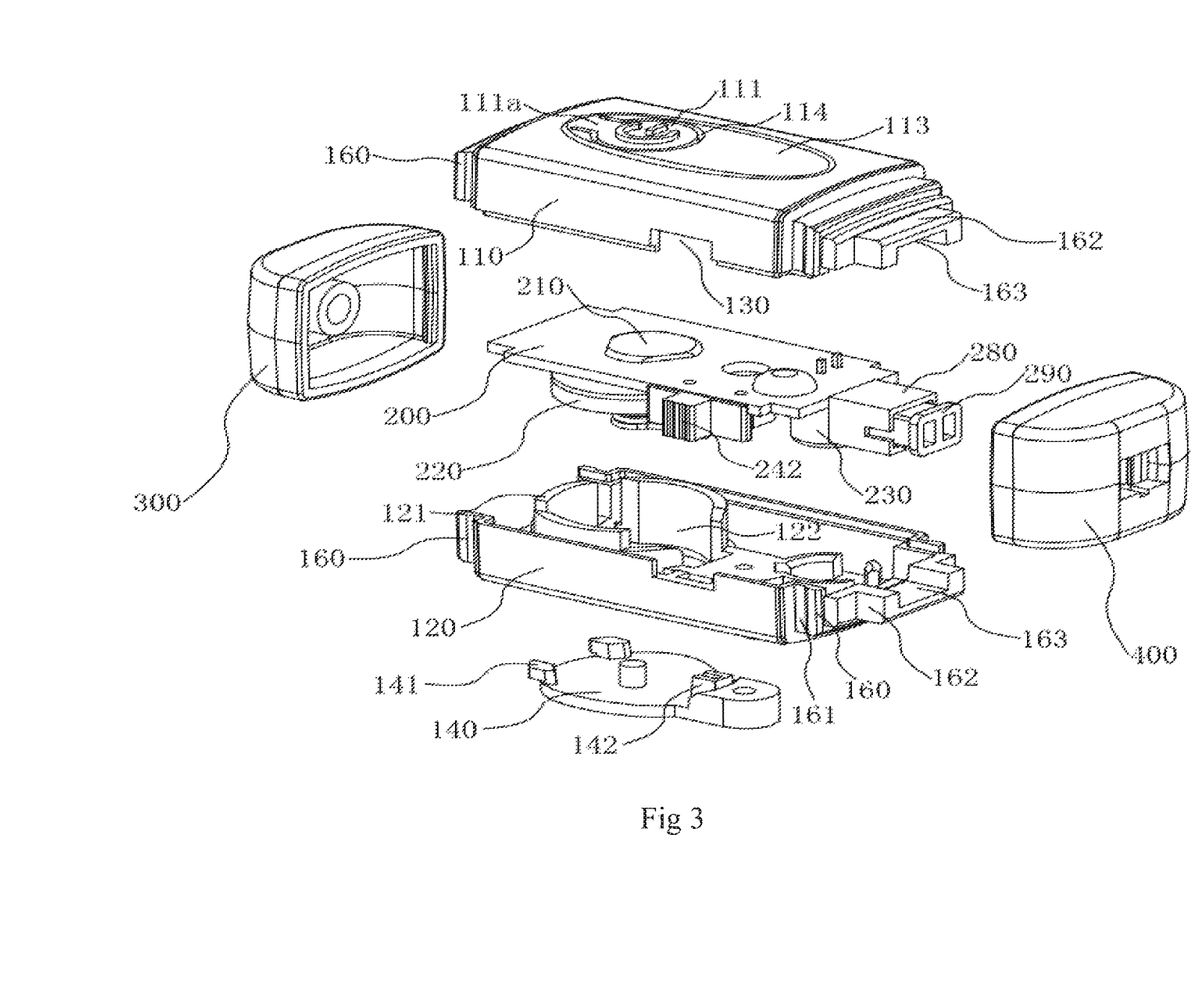
FIG. 3 is an exploded view of FIG. 1.
Figure 5:
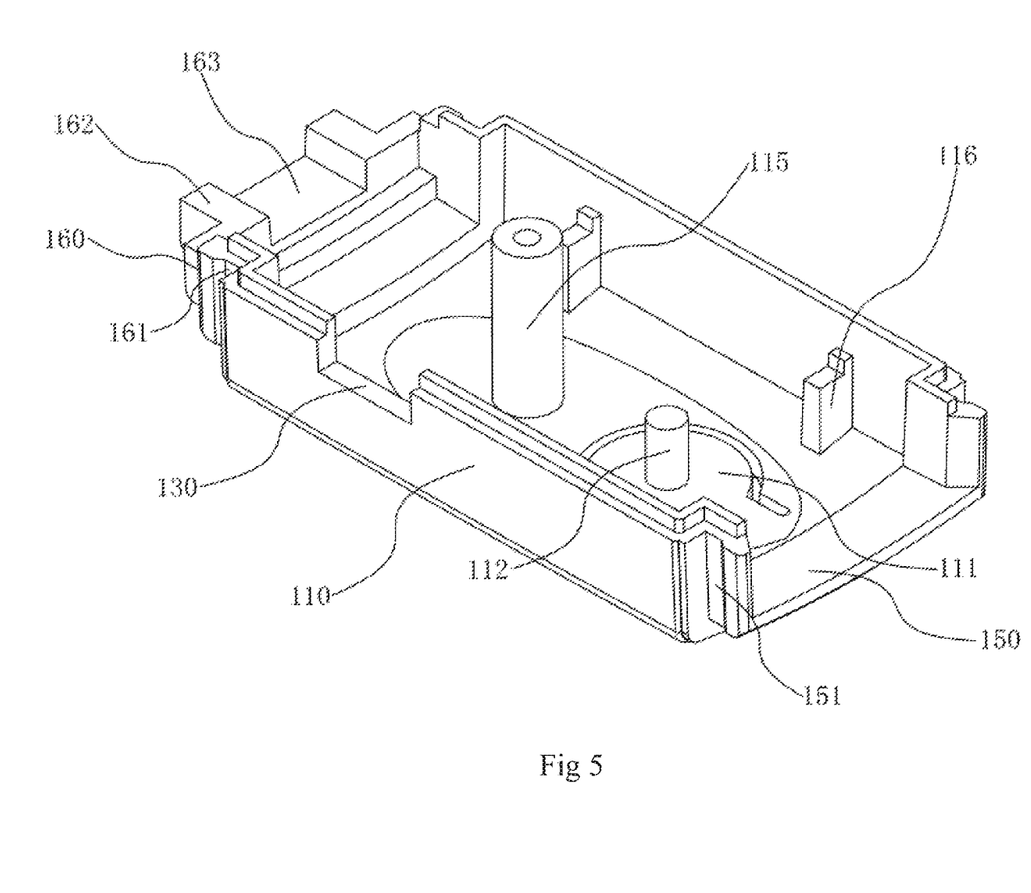
FIG. 5 illustrates the internal structure of the upper case body of the present invention.

The case 100 may be square, round, elliptic or other shapes, and the case 100 comprises an upper case body 110 and a lower case body 120 which can be removably assembled to form an accommodating cavity by bringing them to face each other. As shown in FIG. 1, FIG. 3 and FIG. 5, a spring piece 111 is arranged on the upper case body 110 and can move relative to the same, and a protruding post 112 is arranged on and protruding from the inner surface of the spring piece 111.

Figure 2:
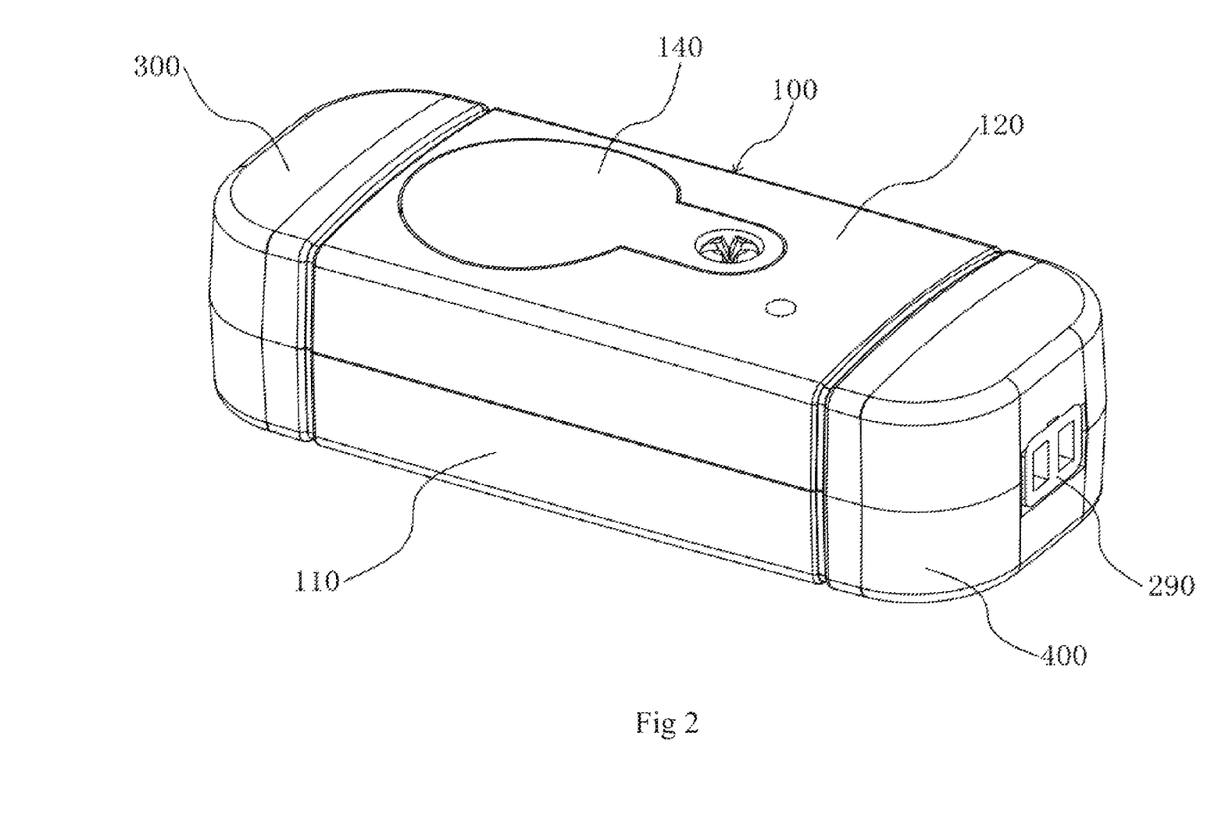
FIG. 2 is a perspective back view of the present invention.
Figure 4:
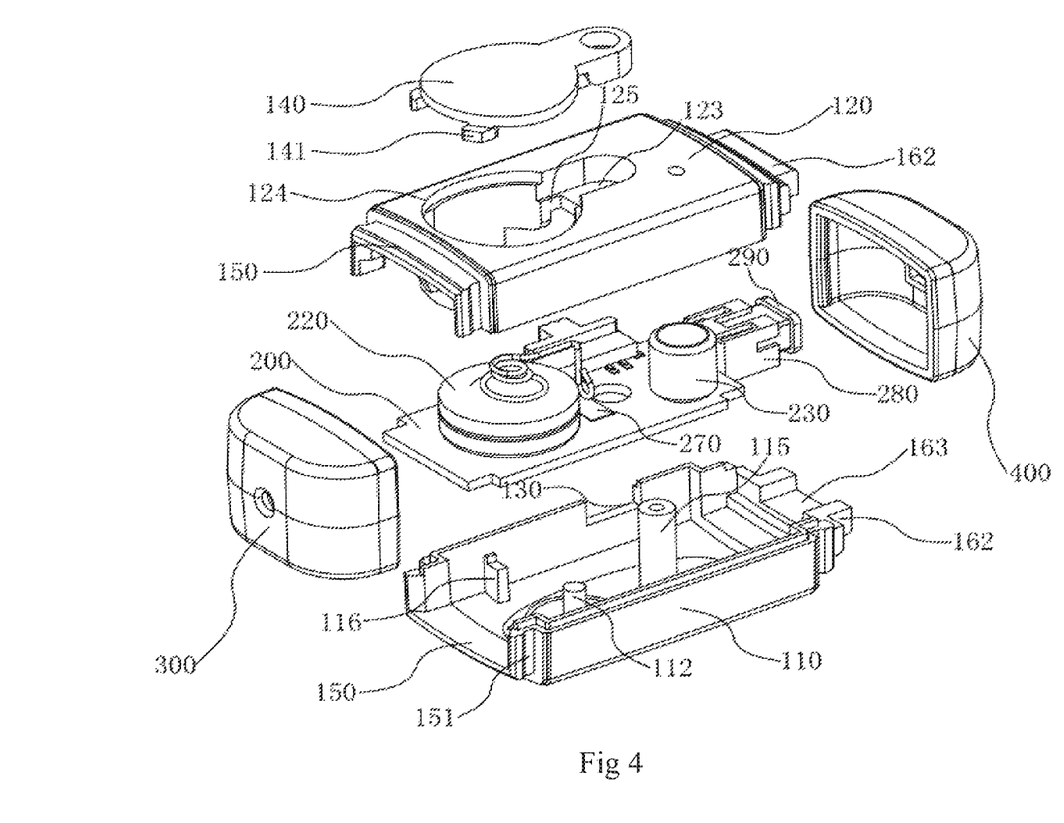
FIG. 4 is an exploded view of FIG. 2.
Figure 7:
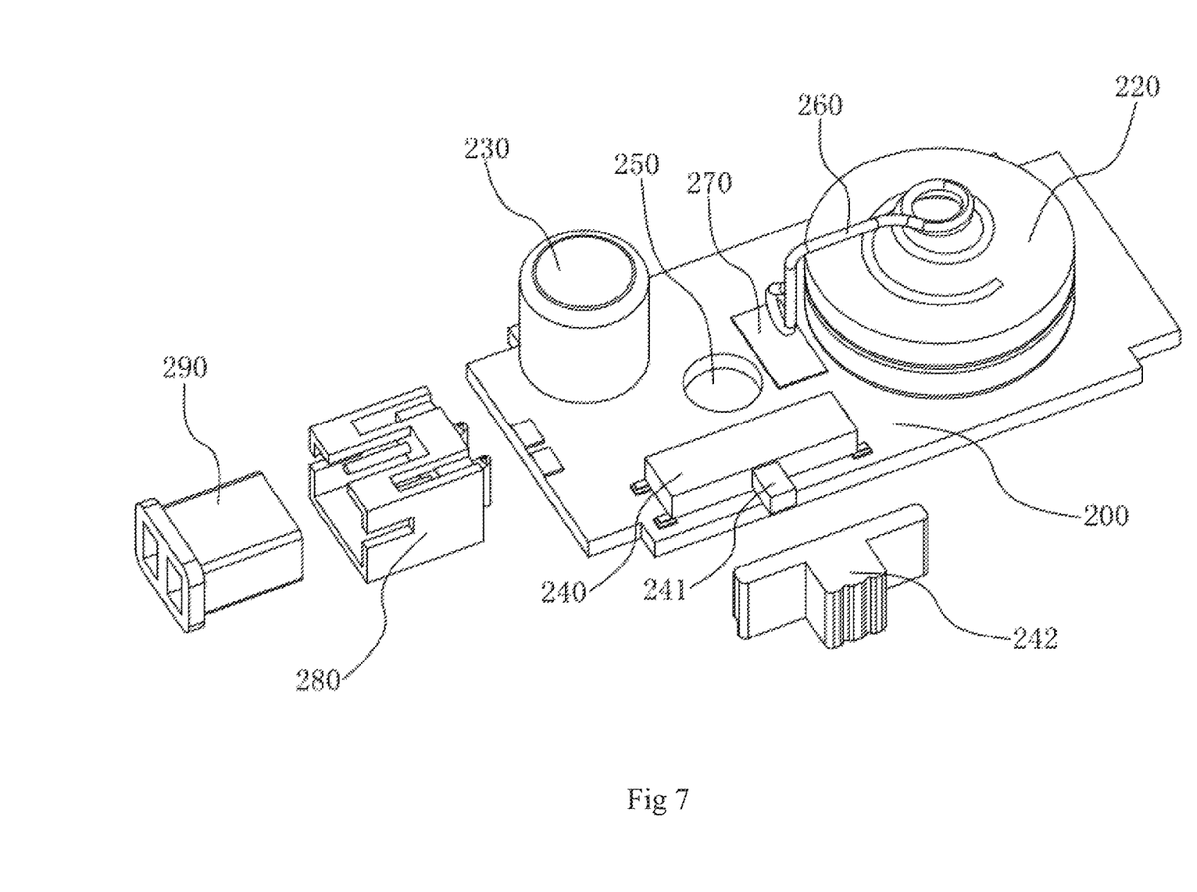
FIG. 7 is a perspective view of the printed circuit board of the present invention.

As shown in FIG. 2, FIG. 4 and FIG. 7, the printed circuit board 200 is horizontally arranged in the accommodating cavity and connected with the upper case body 110, the power source, arranged in the accommodating cavity, is a battery 220 comprising two stacked pieces and one of which 220 contacts the printed circuit board 200, the surface of the printed circuit board 200 facing the upper case body 110 is provided with a contact 210 which can contact the anode of the battery 220. The contact 210 is generally apart from the battery, but when under the external pressure, the contact 210 deforms and contacts the battery 220.

An electro-acoustic transducer 230 is mounted on and electrically connected with the surface of the printed circuit board 200 facing the lower case body 120, and a change-over switch 240 is mounted on and electrically connected with one side of the printed circuit board 200. The change-over switch 240 has three control positions arranged in a line, i.e. OFF position, voice-controlled ON position and mechanical ON position. A knob 241 is provided on one of the control positions of the change-over switch 240 and it can move freely on the three control positions.

Preferably, a shifting block 242 is provided, covering the knob 241, an accommodating notch 130 is made in the outer wall of one side of the upper case body 110 and the same side of the lower case body 120 respectively and the two notches communicate with each other, the shifting block 242 is located in the accommodating notches 130 and protrudes from the outer surfaces of the upper case body 110 and the lower case body 120, and the back part of the shifting block 242 presses against the inner walls of the upper case body 110 and the lower case body 120, so that the knob 241 can be pushed to move by means of the shifting block 242 from outside of the case 100.

In the initial state, the knob 241 is at the OFF position, where both the spring piece 111 and the electro-acoustic transducer 230 cannot make the battery 220 supply power to the printed circuit board 200. When the shifting block 242 is pushed to bring the knob 241 to the voice-controlled ON position, the electro-acoustic transducer 230, the battery 220 and the printed circuit board 200 are electrically connected, the electro-acoustic transducer 230 senses external sound and transduces it into electrical signals, causing the battery 220 to supply power to the printed circuit board 200, but the connection and disconnection of the printed circuit board 200 cannot be controlled by pressing the spring piece 111. When the shifting block 242 is pushed to bring the knob 241 to the mechanical ON position, the battery and the printed circuit board 200 are electrically connected by pressing the spring piece 111, causing the battery 220 to supply power to the printed circuit board 200, but the electro-acoustic transducer is disconnected from the printed circuit board 200. In such a way, the connection and disconnection of the printed circuit board 200 is separately controlled by pressing the spring piece 111 or by means of the electro-acoustic transducer, adding more ways to connect and disconnect the printed circuit board 200 and making the battery box 220 easier and more convenient to use.

Further improvements are made to the present invention based on the structure above.

As shown in FIGS. 1 and 3, a recess 113 is formed into the outer surface of the upper case body 110, a strip-shaped slot 114 is penetrating through the upper case body 110 is formed in the surface of the upper case body 110 located in the recess 113. The strip-shaped slot 114 extends in a circular arc shape, and both ends of the strip-shaped slot 114 are spaced apart and adjacent to each other, the spring piece 111 is surrounded by the whole of the strip-shaped slot 114 and has a circular shape. The two ends of the strip-shaped slot 114 extend towards the same end of the upper case body 110 and form a connecting part 111a connecting the upper case body and the spring piece 111, and of course, the strip-shaped slot 114 can extend into other shapes, for example square or ellipse.

The spring piece 111 is partly isolated from the upper case body 110 by the strip-shaped slot 114, giving the spring piece 111 some elasticity. Therefore, the spring piece 111 can automatically come back to the original place as soon as the pressure on it is released, realizing a user-friendly design. Compared to existing elastic structures, the spring piece 111 and the upper case body 110 forms one piece, sparing the assembly and the addition of other reset parts. Besides, the spring piece has a simple structure, takes little space and is easy to produce and process. Moreover, since the spring piece 111 is located in the recess 113 of the upper case body 110 and cannot protrude from the outer surface of the upper case body 110, the contact 210 will not be pressed by the spring piece 111 in abnormal situations, limiting the number of pressures on the spring piece 111 and effectively saving the power of the battery 220.

As shown in FIGS. 4 and 5, at least one connecting post 115 is provided on and protruding from the inner surface of the upper case body 110. Preferably, the number of the connecting post 115 is one and at the center of the inner surface of the upper case body 110 and one connecting hole 250 is correspondingly made at the center of the printed circuit board 200 so that the connecting post 115 goes through the connecting hole 250 and is removably connected with the lower body 120. Such a structure facilitates the assembly and disassembly of the printed circuit board 200 and the upper case body 110, providing convenience for later repair and change of the printed circuit board. The coordination of the connecting post 115 and the connecting hole 250 improves the horizontal stability of the printed circuit board 200 and quick positioning of the printed circuit board 200 in assembly.

Further, cushion blocks 116 are arranged at two sides of the inner surface of the upper case body 110. Preferably, each side are provided with two cushion blocks 116, two cushion blocks 116 are axially placed apart, each cushion block 116 is permanently connected with the inner surface of the upper case body 110 and the side walls of the upper case body 110, the upper surfaces of all cushion blocks 116 are at the same level, the width of the printed circuit board 200 is slightly less than that of the upper case body 110 and the two sides of the printed circuit board 200 rest on the corresponding cushion blocks 116.

In this case, the cushion blocks 116 function as a support of the printed circuit board 200 in such a way that the printed circuit board 200 will not shake up and down in the upper case body 110, increasing the vertical stability of the printed circuit board 200 and placing the printed circuit board 200 more steadily in the upper case body 110. Besides, the printed circuit board 200 will not move with the spring piece 111 as the spring piece 111 is pressed, causing the protruding post 112 to be unable to touch and move the contact 210, so the sensitivity of the protruding post 112 and the contact 210 is improved.

Figure 6:
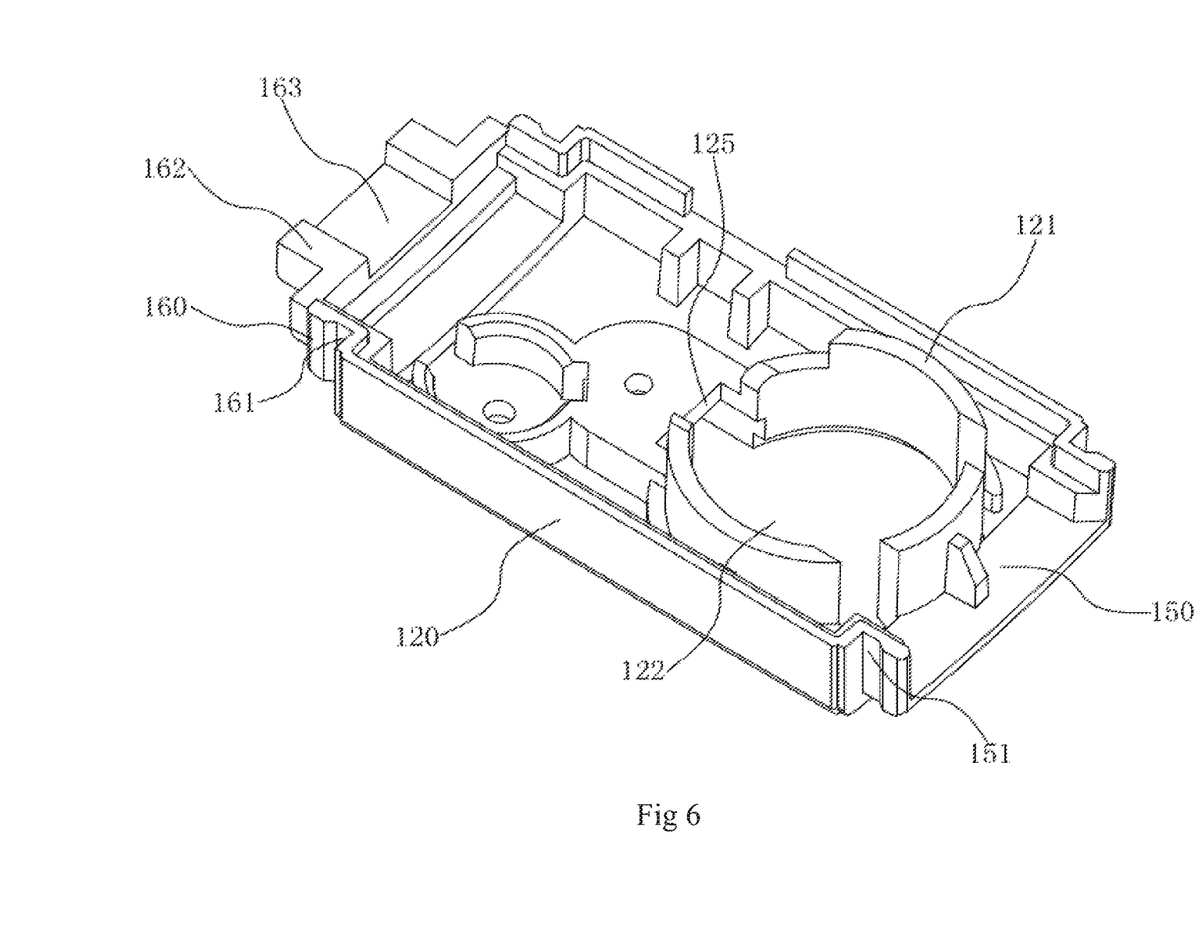
FIG. 6 illustrates the internal structure of the lower case body of the present invention.

As shown in FIGS. 4 and 6, curved retaining blocks 121 are arranged on and protruding from the inner surface of the lower case body 120, enclosing a trough 122 for mounting a battery 220, and the printed circuit board 200 lies on the mounting trough 122 and contacts the battery 220.

Since the inside of the lower case body 120 is the accommodating cavity, it is difficult to form the mounting groove 122 in other manners and cause a complicated structure, and the mounting groove 122 is formed by projecting a snap ring on the inner surface of the lower case body 120, so that the entire mounting groove 122 is easily formed. The battery 220 is mounted in the mounting groove 122 and is blocked by the snap ring to improve the stability of the battery 220 mounted on the lower case 120.

Further, an accommodating groove 123 is formed into the outer surface of the lower case body 120, a mounting opening 124 communicating with the mounting trough 122 and intended for mounting the battery 220 are made in the accommodating groove 123, and a cover plate 140 is provided in the accommodating groove 123 to close the mounting opening 124. The outer surface of the cover plate 140 flushes with that of the lower case body 120 and one end of the cover plate 140 is provided with screws (not illustrated in the figures) which go through the lower case body 120 and mesh with the threads of the connecting studs 115.

Provision of the mounting opening 124 makes it easier to put the battery 220 in and take it out of the lower case body 120, therefore there is no need of taking the upper case body 110 apart from the lower case body 120 to replace the battery 220, simplifying the change of the battery 220. The cover plate 140 encloses the battery 220 in the mounting trough 122 and prevents it from movement in normal use of the battery 220 box, and it is easily removed when the battery 220 needs change. The accommodating groove provided allows the outer surface of the cover plate 140 to be at the same level as that of the lower case body 120 when the cover plate 140 is placed on the lower case body 120, effectively controlling the whole battery 220 box to be a proper volume. The cover plate 140, the lower case body 120 and the upper case body 110 are permanently connected by means of screws, facilitating the assembly and disassembly of the cover plate 140, the lower case body 120 and the upper case body 110 and simplifying the connection of the three parts.

Figure 8:
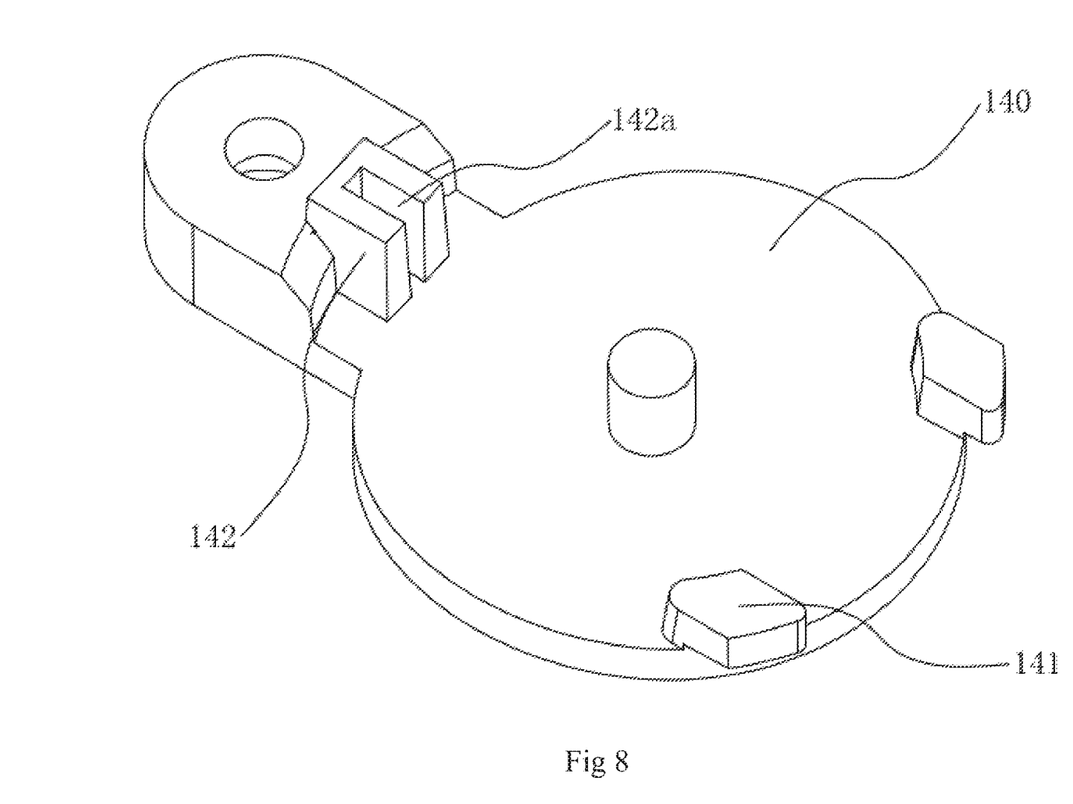
FIG. 8 is a perspective view of the cover plate of the present invention.

As shown in FIGS. 4 and 8, pins 141 are provided at and extend outward from one end of the cover plate 140, and slots for inserting and fastening the pins 141 are made in the lower case body 120 along the edge of the accommodating groove, a protruding block 142 is provided at the lower surface of the other end of the cover plate 140 and made with a wire accommodating groove 142a, and a mounting notch 125 is made in the bottom of the accommodating groove and communicating with the mounting opening 124, so that when the cover plate 140 is placed in the accommodating groove, the protruding block 142 goes into the mounting notch 125 and the conductive wiring 260 is placed in the wire accommodating groove 142a.

To mount the cover plate 140, extend the two pins 141 of the cover plate 140 into the corresponding slots, and then place the whole cover plate 140 in the accommodating groove. Once in the slots, the pins 141 press against the inner surface of the lower case body 120 to prevent the cover plate 140 from moving away from the lower case body 120. The protruding block 142 coordinates with the inserting hole, further improving the stability of the cover plate 140 in the lower case body 120. The wire accommodating groove 142a keeps the middle of the conductive wiring 260 in place, avoiding the separation of the conductive wiring 260 from the printed circuit board 200 caused by slight movement of the battery 220, thereby further improving the stability of the conductive wiring 260.

As shown in FIGS. 3 and 4, an conductive wiring 260 is provided in the accommodating cavity, one spiral end of the conductive wiring 260 is placed between the battery 220 cathode and the cover plate 140 and the other end of the conductive wiring 260 contacts the conductive part 270 which is mounted on the surface of the printed circuit board 200 back to the upper case body 110 so that when the spring piece 111 is pressed, the battery 220 is connected with the printed circuit board 200 and supplies power to the printed circuit board 200.

The conductive wiring 260 realizes the connection of the battery 220 cathode and the printed circuit board 200, enabling the battery 220 to supply power to the printed circuit board 200. When the spring piece 111 is pressed, the contact 210 contacts the anode of the battery, realizing the electric connection between the battery 220 and the printed circuit board 200. One end of the conductive wiring 260 is spiral and the other end is apart from the conductive part 270 so that when the cover plate 140 is mounted and the spiral end is pressed flat, the other end moves to contact the conductive part 270. In such connection, there is no substantive connection between the conductive wiring and the battery 220 and the cover plate 140, so the conductive wiring 260 can be readily removed from the battery 220 and the cover plate 140, facilitating change of the battery 220.

As shown in FIG. 1-4, a left end cap 300 is provided for and flexibly connected with the one end of the case 100 and a right end cap 400 is provided for and flexibly connected with the other end of the case 100, wherein a wire hole 320 for fixing the light wire is made through the left end cap 300, accommodating holes 420 for plug-in connectors used for electrical connection with the light wire and the printed circuit board 200 to pass through are made through the right end cap 400.

As shown in FIG. 2-6, a first clamping part 150 protrudes from one end of the case 100, the first clamping part 150 has two portions: an upper portion and a lower portion connected with the upper case body 110 and the lower case body 120, a first clamping groove 151 is made at each side of the first clamping part 150, the left end cap 300 has a cap-shaped structure with a cavity, a first clamping block 310 is made on and protruding from the inner wall of each side of the left end cap 300 so that the first clamping blocks 310 are clamped into the first clamping grooves 151 to permanently connect the left end cap 300 and the case 100 together; a second clamping part 160 protrudes from the other end of the case 100, the second clamping part 160 also has two portions: an upper portion and a lower portion connected with the upper case body 110 and the lower case body 120, a second clamping groove 161 is made at each side of the second clamping part 160, the right end cap 400 also has a cap-shaped structure with a cavity, a second clamping block 410 (not illustrated in the figures) is made on and protruding from the inner wall of each side of the right end cap 400 so that the second clamping blocks 410 are clamped into the second clamping grooves 161 to permanently connect the right end cap 400 and the case 100 together.

In application, the battery 220 box is connected with a light wire connected in series with multiple LED lamps to form a necklace which can give light, while the battery box 220 has an integral design in traditional necklaces where both ends of the light wire are secured in both ends of the battery 220 box respectively, so the light wire cannot be separated from the battery 220 box once fixed in place, limiting the use of the whole necklace. In the event that the light wire is broken, the battery 220 box has to be opened to reconnect the light wire and the battery 220 box. However, in the present invention, the ends of the case 100 are provided with a left end cap 300 and a right end cap 400 respectively, the left end cap 300 and the right end cap 400 are connected with the case 100 by clamping so that the left end cap 300 and the right end cap can be readily removed from the case 100, sparing concerns about breakage of the light wire. In addition, multiple necklaces that can give light can be connected together one by one using such a structure, increasing the connections and combinations of different necklaces and enhancing the beautifying and decorative effects of necklaces.

One end of the printed circuit board 200 is provided with plug-in connectors, which are a connecting base 280 and a plug-in block 290, wherein the connecting base 280 is electrically connected with the printed circuit board 200 and the plug-in block 290 is permanently connected with the other end of the light wire. The structure described above facilitates the connection and disconnection of the light wire and the printed circuit board 200 and allows connecting multiple necklaces one by one to realize combination of different necklaces.

In application, one end of the light wire is lead through the wire hole 320 and a knot is tied in it to permanently connect the end with the left end cap 300, the other end of the light wire is permanently connected with the plug-in block 290 directly, the plug-in block 290 is connected to the connecting base 280, and finally the left end cap 300 and the right end cap 400 are permanently connected to the case 100. In such a way, the light wire can be easily connected with the case 100, sparing concerns about breakage of the light wire, and multiple light wires and multiple battery boxes 220 can be connected one by one to enhance the overall beautifying effect of the necklaces.

Further, a mounting part 162 protrudes outward from the second connecting part 111*a*, a mounting hole 163 is made through the mounting part 162 and communicates with the accommodating cavity, and a connecting base 280 is located in the mounting hole 163 and clings to the inner walls of the mounting hole 163.

The mounting part 162 is provided to limit and protect the connecting base 280 in such a way that the connecting base 280 is more stable and not easily separated from the printed circuit board 200 due to shake, ensuring normal service of the battery 220 box.

Figure 9:
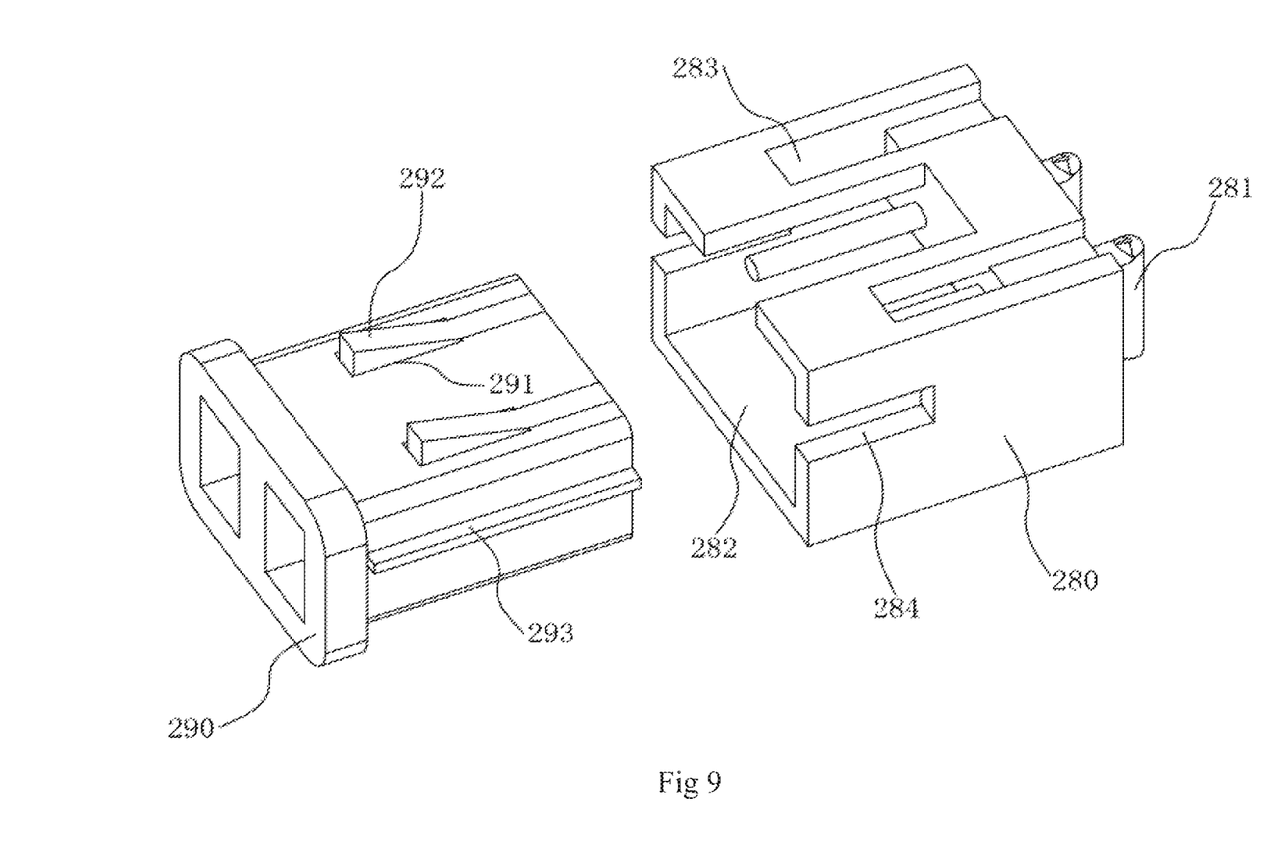
FIG. 9 is an exploded diagram of the connecting base and the plug-in block of the present invention.

As shown in FIG. 7 and FIG. 9, the end of the connecting base 280 permanently connected with the printed circuit board 200 is arranged with conductive rods 281 electrically connected with the printed circuit board 200, the other end of the connecting base 280 is made with a plug-in connecting hole 282, one end of the conductive rods 281 protrudes through the connecting base 280 into the plug-in connecting hole 282, the plug-in block 290 is made with jacks into which the light wire protrudes, the plug-in block 290 can be inserted into the plug-in connecting hole 282 and the conductive rods 281 can be inserted into the jacks and electrically connected with the light wire.

The plug-in connection of the plug-in block 290 and the connecting base 280 facilitates the assembly and disassembly of the plug-in block 290 and the connecting base 280, the conductive rods 281 are provided to realize the electrical connection between the connecting base 280 and the printed circuit board 200 as well as the electrical connection between the connecting base 280 and the plug-in block 290, thus connecting the battery 220 and the light wire by means of the printed circuit board 200 and enabling the battery 220 to supply power to the LED lamps.

Further, limiting holes 283 are made through the top of the connecting base 280 and communicate with the plug-in connecting hole 282, and limiting blocks 292 are made on and protruding from the outer surface of the plug-in block 290, wherein the limiting block 292 is a sloping block which raise gradually from the front to the back, one end of which is connected with the connecting base 280 and the other end of which can move vertically relative to the connecting base 280. When the plug-in block 290 is inserted into the plug-in connecting hole 282, the limiting blocks 292 are located in the limiting holes 283 and the one end of the sloping block presses against the inner wall of the limiting holes, fixing the plug-in block 290 and the connecting base 280 together. When the limiting block 292 is pressed until the upper surface of the limiting block 292 flushes with the surface of the connecting base 280 or is lower than the surface of the connecting base 280, the plug-in block 290 can be isolated from the connecting base 280.

The plug-in block 290 and the connecting base 280 configured in such a way are not easily separated in the axial direction once connected, improving the steadiness of the connection between the plug-in block 290 and the connecting base 280; besides, such a configuration facilitates the assembly and disassembly of the plug-in block 290 and the connecting base 280, providing high flexibility in use.

Furthermore, guide notches 284 are made in the side walls of the connecting base 280 and guide blocks 293 are provided on the outer surface of the plug-in block 290 so that when the plug-in block 290 moves into or out of the plug-in connecting hole 282, the guide blocks 293 moves in the guide notches 284.

In this case, the guide blocks 293 and the guide notches 284 are provided to guide and facilitate the insertion of the plug-in block 290 into the connecting base 280 in assembly; besides, the guide blocks 293 and the guide notches 284 have a lateral limiting function to prevent the plug-in block 290 from lateral movement or rotation in the connecting base 280.

The operating principle of the present invention is as below:

In the initial state, the knob 241 is at the OFF position, where both the spring piece 111 and the electro-acoustic transducer 230 cannot make the battery 220 supply power to the printed circuit board 200.

When the shifting block 242 is pushed to bring the knob 241 to the voice-controlled ON position, the electro-acoustic transducer 230, the battery 220 and the printed circuit board 200 are electrically connected, the electro-acoustic transducer 230 senses external sound and transduces it into electrical signals, causing the battery 220 to supply power to the printed circuit board 200, but the connection and disconnection of the printed circuit board 200 cannot be controlled by pressing the spring piece 111.

When the shifting block 242 is pushed to bring the knob 241 to the mechanical ON position, as the spring piece 111 is pressed, the protruding post 112 presses against the contact 210 and connects the contact 210 and the anode of the battery 220, and the power source and the printed circuit board 200 are electrically connected, causing the battery 220 to supply power to the printed circuit board 200, but the electro-acoustic transducer is disconnected from the printed circuit board 200.

In such a way, the connection and disconnection of the printed circuit board 200 is separately controlled by pressing the spring piece 111 or by means of the electro-acoustic transducer, adding more ways to connect and disconnect the printed circuit board 200 and making the battery box 220 easier and more convenient to use.

To change the battery 220, remove the screws, take the cover plate 140 out of the accommodating groove, separate the conductive wiring 260 from the battery 220, take out the used battery 220, put in a new battery 220, replace the cover plate 140, and tighten the screws to finish the change of the battery 220.

The embodiments described herein are intended for illustrating the spirit of the present invention only. Those skilled in the technical field of the present invention can make various modifications or additions or adopt similar alternatives to the embodiments described herein without departure from the spirit of the present invention or going beyond the definitions of the claims attached.

What is claimed is:

1. A multi-functional battery box, comprising:
   a case, having an accommodating cavity;
   a printed circuit board, located in the accommodating cavity and permanently connected with the case;
   a power source, located in the accommodating cavity and in contact with the printed circuit board;
   an electro-acoustic transducer, permanently arranged on the printed circuit board and electrically connected with the printed circuit board;
   a spring piece, arranged on the case and in contact with the printed circuit board;
   a change-over switch, flexibly connected with the printed circuit board;
   when the change-over switch electrically connects the electro-acoustic transducer, the power source and the printed circuit board, the electro-acoustic transducer can transduce sound signals into electrical signals and powers the printed circuit board; when the change-over switch electrically connects the power source and the printed circuit board, power can be supplied to the printed circuit board by pressing the spring piece.

2. The multi-functional battery box as claimed in claim 1, wherein the case comprises an upper case body and a lower case body, wherein a strip-shaped slot is made through the outer surface of the upper case body, spaced apart at its ends and enclosing the spring piece.

3. The multi-functional battery box as claimed in claim 2, wherein a recess is formed into the outer surface of the upper case body, and the spring piece is arranged within the recess.

4. The multi-functional battery box as claimed in claim 2, wherein at least one connecting post is provided on and protruding from the inner surface of the upper case body and the printed circuit board is provided with at least one connecting hole, the connecting post passes through the connecting hole and is detachably connected with the lower case body.

5. The multi-functional battery box as claimed in claim 2, wherein cushion blocks are arranged at two sides of the inner surface of the upper case body, permanently connected with the inner surface of the upper case body and the side walls of the upper case body, and the two sides of the printed circuit board rest on the corresponding cushion blocks.

6. The multi-functional battery box as claimed in claim 2, wherein curved retaining blocks are arranged on and protruding from the inner surface of the lower case body, enclosing a mounting trough for mounting a battery, and the printed circuit board lies on the mounting trough and contacts the battery.

7. The multi-functional battery box as claimed in claim 6, wherein an accommodating groove is formed into the outer surface of the lower case body, a mounting opening communicating with the mounting trough and intended for mounting battery is made in the bottom of the accommodating groove, and a cover plate, provided in the accommodating groove, flexibly connected with the lower case body and with its outer surface flushing with that of the lower case body, is designed for closing the mounting opening.

8. The multi-functional battery box as claimed in claim 7, wherein an conductive wiring is provided in the accommodating cavity, one spiral end of the conductive wiring is placed between the battery cathode and the cover plate and the other end contacts the printed circuit board so that when the spring piece is pressed, the battery is connected with the printed circuit board and supplies power to the same.

9. The multi-functional battery box as claimed in claim 7, wherein pins are provided at and extend outward from one end of the cover plate, and slots for inserting and fastening the pins are made in the lower case body along the edge of the accommodating groove.

10. The multi-functional battery box as claimed in claim 7, wherein a protruding block is provided at one end of the lower surface of the cover plate and made with a wire accommodating groove, and a mounting notch is made in the bottom of the accommodating groove and communicating with the mounting trough, so that when the cover plate is placed in the accommodating groove, the protruding block goes into the mounting notch and the conductive wiring is placed in the wire accommodating groove.

11. The multi-functional battery box as claimed in claim 1, wherein a left end cap is provided for and flexibly connected with the one end of the case and a right end cap is provided for and flexibly connected with the other end of the case, wherein a wire hole for fixing the light wire is made through the left end cap, accommodating holes for plug-in connectors used for electrical connection with the light wire and the printed circuit board respectively to pass through are made through the right end cap.

12. The multi-functional battery box as claimed in claim 11, wherein:
   a first clamping part protrudes from one end of the case, a first clamping groove is made at each side of the first clamping part, a first clamping block is made on and protruding from the inner wall of each side of the left end cap, and the first clamping blocks are clamped into the first clamping grooves; a second clamping part protrudes from the other end of the case, a second clamping groove is made at each side of the second clamping part, a second clamping block is made on and protruding from the inner wall of each side of the right end cap, and the second clamping blocks are clamped into the second clamping grooves.

13. The multi-functional battery box as claimed in claim 12, wherein a mounting part extends outward from the second clamping part, a mounting hole is made through the mounting part and communicates with the accommodating cavity, and a connecting base is located in the mounting hole and clings to the inner walls of the same.

14. The multi-functional battery box as claimed in claim 11, wherein the plug-in connectors include:
   the connecting base, located in the second clamping part and electrically connected with the printed circuit board;

a plug-in block, permanently connected with the light wire, removably connected with the connecting base and allowing electrical connection between the light wire and the printed circuit board.

15. The multi-functional battery box as claimed in claim 14, wherein the end of the connecting base permanently connected with the printed circuit board is arranged with conductive rods electrically connected with the printed circuit board, the other end of the connecting base is made with a plug-in connecting hole, one end of the conductive rods protrudes through the connecting base into the plug-in connecting hole, the plug-in block is made with jacks into which the light wire protrudes, the plug-in block can be inserted into the plug-in connecting hole and the conductive rods can be inserted into the jacks and electrically connected with the light wire.

16. The multi-functional battery box as claimed in claim 14, wherein limiting holes are made through the top of the connecting base and communicate with the plug-in connecting hole, and limiting blocks which can move vertically relative to the outer surface of the plug-in block are made on and protruding from the outer surface of the plug-in block; when the plug-in block is inserted into the plug-in connecting hole, the limiting blocks are located in the limiting holes.

17. The multi-functional battery box as claimed in claim 14, wherein guide notches are made in the side walls of the connecting base and guide blocks are projected on the outer surface of the plug-in block so that when the plug-in block moves into or out of the plug-in connecting hole, the guide blocks moves in the guide notches.

* * * * *